United States Patent
Asahara et al.

(10) Patent No.: US 10,981,474 B2
(45) Date of Patent: Apr. 20, 2021

(54) WORK VEHICLE HAVING AIR HANDLING SYSTEM

(71) Applicant: KUBOTA CORPORATION, Osaka (JP)

(72) Inventors: Masato Asahara, Hyogo (JP); Hideki Aoki, Duluth, GA (US); Akira Minoura, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 39 days.

(21) Appl. No.: 16/227,724

(22) Filed: Dec. 20, 2018

(65) Prior Publication Data

US 2020/0198507 A1 Jun. 25, 2020

(51) Int. Cl.
*B60N 2/56* (2006.01)
*B60N 2/38* (2006.01)

(52) U.S. Cl.
CPC ............ *B60N 2/5642* (2013.01); *B60N 2/38* (2013.01); *B60N 2/5607* (2013.01); *B60N 2/5657* (2013.01)

(58) Field of Classification Search
CPC .......... B60N 2/38; B60N 2/56; B60N 2/5642; B60N 2/5607; B60N 2/565; B60N 2/5657; B60N 2/5635; A47C 7/74; A47C 7/742; A47C 7/744; B60H 1/00407; B60H 1/00285; Y10S 454/907
See application file for complete search history.

(56) References Cited

U.S. PATENT DOCUMENTS

| | | | | |
|---|---|---|---|---|
| 4,685,727 A * | 8/1987 | Cremer | ................ | B60N 2/5635 297/180.14 |
| 5,102,189 A * | 4/1992 | Saito | ................... | B60N 2/5635 261/DIG. 88 |
| 6,079,485 A | 6/2000 | Esaki et al. | | |
| 6,746,076 B2 * | 6/2004 | Bogisch | ................... | B60J 7/223 297/180.14 |
| 6,976,734 B2 | 12/2005 | Stoewe | | |
| 10,471,865 B2 * | 11/2019 | Kato | .................... | B60N 2/5657 |

(Continued)

FOREIGN PATENT DOCUMENTS

| | | | | |
|---|---|---|---|---|
| DE | 10144839 A1 * | 3/2003 | ........... | B60N 2/5635 |
| DE | 10259621 A1 * | 7/2004 | ........... | B60N 2/5635 |

(Continued)

OTHER PUBLICATIONS

Machine Translation of JP2006131106; Mar. 26, 2020; https://dialog.proquest.com/professional/cv_2183530/docview/1394331350/fulltextwithgraphics/170706F2FD75426ABA8/4?accountid=131444 (Year: 2020).*

*Primary Examiner* — Ryan D Kwiecinski
(74) *Attorney, Agent, or Firm* — Greenblum & Bernstein, P.L.C.

(57) ABSTRACT

A seat of a work vehicle includes a seatback, a seat cushion and an air handling system incorporated within the seatback. The air handling system includes an air circulation space formed inside the seatback, an air handling device disposed in the air circulation space, an inlet portion formed in a top face of the seatback for letting in ambient air into the air circulation space and an outlet portion formed in a lateral portion of the seatback for discharging handled air handled by the air handling device to an area forwardly of the seatback in a vehicle body transverse direction.

8 Claims, 7 Drawing Sheets

(56) References Cited

U.S. PATENT DOCUMENTS

| | | | |
|---|---|---|---|
| 10,479,242 B2 * | 11/2019 | Kato | B60N 2/5635 |
| 2007/0107440 A1 * | 5/2007 | Ito | B60N 2/5657 62/3.2 |
| 2013/0206852 A1 * | 8/2013 | Brykalski | B60N 2/5657 237/2 A |
| 2014/0179212 A1 * | 6/2014 | Space | B60N 2/5657 454/76 |
| 2015/0197136 A1 * | 7/2015 | Chen | B60H 1/00285 62/3.61 |
| 2017/0166044 A1 * | 6/2017 | Asahara | F02M 37/0088 |
| 2018/0160816 A1 * | 6/2018 | Akaike | A47C 7/744 |
| 2019/0359106 A1 * | 11/2019 | Suzuki | B60N 2/885 |

FOREIGN PATENT DOCUMENTS

| | | | | |
|---|---|---|---|---|
| DE | 102009024332 A1 * | 12/2010 | | B60N 2/5635 |
| EP | 1193095 A2 * | 4/2002 | | B60N 2/5635 |
| EP | 3480056 A1 * | 5/2019 | | B60N 2/5635 |
| JP | 2006131106 A * | 5/2006 | | B60H 1/00285 |
| JP | 2010006174 A * | 1/2010 | | B60N 2/5635 |
| JP | 2018131005 A * | 8/2018 | | B60H 1/00285 |
| WO | WO-2008062295 A1 * | 5/2008 | | B60N 2/5642 |
| WO | WO-2017185284 A1 * | 11/2017 | | B60N 2/5621 |

* cited by examiner

WORK VEHICLE HAVING AIR HANDLING SYSTEM

TECHNICAL FIELD

This invention relates to a work vehicle, in particular, an "open-seater" work vehicle (meaning having a seat exposed to the outside environment), having an air handling system for a seat mounted on a vehicle body frame.

BACKGROUND ART

In a seat heating/cooling device according to U.S. Pat. No. 6,079,485, an electrically powered fan and a heating/cooling unit are disposed at positions away from a seat. Conditioned air sent out by the electrically powered fan is introduced into a duct formed inside a seatback through an air feed pipe disposed under the seat. To this duct, there is connected an air nozzle which is opened in the surface of the seatback, so that the conditioned air introduced to the duct is discharged against the back of a seated passenger via the air nozzle. With this seat heating/cooling device, a space is needed for layout of the air feed pipe which connects the electrically powered fan to the duct. Further, if the air nozzle is blocked by the passenger's back, the amount of air discharged from the air nozzle is reduced, thus inviting deterioration in the air conditioning effect.

In the seat air conditioning device disclosed in U.S. Pat. No. 6,079,485, an air conditioning unit and a blower for discharging conditioned air are disposed on the back side of the seatback. Conditioned air will be sent into a heat exchanger chamber formed inside the seatback to effect heat exchange with the surface of the seatback and will be discharged against the seated passenger's back via discharge holes formed in the surface of the seatback. With this seat air conditioning device too, there remains the shortcoming of air conditioning effect deterioration due to blocking of the discharge holes by the passenger's back. If the area of air introduction by the blower is located under the seatback and an engine or the like is disposed behind the seatback, the blower will let in engine heated air. This deteriorates the cooling function of the air conditioning device.

According to a seat air conditioning device disclosed in U.S. Pat. No. 6,976,734, by means of a fan disposed inside a lower portion of a rear seat, air present in the rear area of the rear seat is fed to an air distribution structure formed inside a rear seat and the air also is discharged against the passenger's back through air-permeable fabric which forms the surface of the seatback. With this seat air conditioning device too, air conditioning effect deterioration due to blockage of the air communication holes of the air permeable fabric and inadvertent introduction of heated air from the engine disposed behind the seatback is unavoidable.

SUMMARY OF THE INVENTION

An object of the present invention is to provide a work vehicle having an air handling system for making an upper body of a passenger seated at a seat comfortable with conditioned air.

A work vehicle according to the present invention comprises:
 a vehicle body frame;
 a seat mounted on the vehicle body frame and including a seatback and a seat cushion; and
 an air handling system incorporated within the seatback;
  wherein the air handling system includes an air circulation space formed inside the seatback, an air handling device disposed in the air circulation space, an inlet portion formed in a top face of the seatback for letting in ambient air into the air circulation space, and an outlet portion formed in a lateral portion of the seatback for discharging handled air handled by the air handling device to an area forwardly of the seatback in a vehicle body transverse direction.

With the above-described arrangement, via an inlet portion from an upper area of the seatback, air is introduced into the air circulation space formed inside the seatback. Then, the handled air handled by the air handling device inside the air circulation space will be discharged via the outlet portion to flow through the front area of the seatback in the vehicle body transverse direction. With this arrangement, even in a work vehicle having an engine mounted rearwardly of the seatback, introduction of engine heated air by the blower will be suppressed. Moreover, since the outlet portion is formed in a lateral portion of the seatback, there is less possibility of this outlet portion being blocked by the passenger's back and the discharged handled air will flow through the front area of the seatback in the vehicle body transverse direction, so a sufficient amount of the handled air will come into contact with the passenger. Thus, this air handling system can make the upper body of the passenger seated at the seat comfortable with the handled air.

In order to make the upper body of the passenger seated at the seat comfortable with the handled air, it is preferred that the handled air discharged via the outlet portion be allowed to flow effectively through the front area of the seatback in the vehicle body width direction. Thus, according to one preferred embodiment of the present invention, the seatback includes a left side cover for covering the left side of a person seated at the seat and a right side cover for covering the right side of the person; and the outlet portion is formed in one or both of the left side cover and the right side cover. Further, if the left side cover and the right side cover respectively has a width sufficient to cover the respective lateral portion of the passenger, these side covers can function as protective walls against heated air from the engine disposed rearwardly of the seatback.

DETAILED DESCRIPTION

A grass mower as one embodiment of a work vehicle relating to the present invention will be explained with reference to the accompanying drawings. This work vehicle is configured as an open-seater work vehicle having a seat exposed to the outside. In this detailed discussion, unless explicitly indicated otherwise, the term "front" means the front side with respect to the vehicle body front/rear direction (traveling direction), and the term "rear" means the rear side with respect to the vehicle body front/rear direction (traveling direction). Also, the language "left/right direction" or "lateral direction" means the vehicle body transverse direction (machine body width direction) perpendicular to the machine body front/rear direction. The term "upper" or "lower" refers to positional relationship with respect to the perpendicular (vertical) direction of the vehicle body, denoting the ground clearance relationship.

Figure 1:
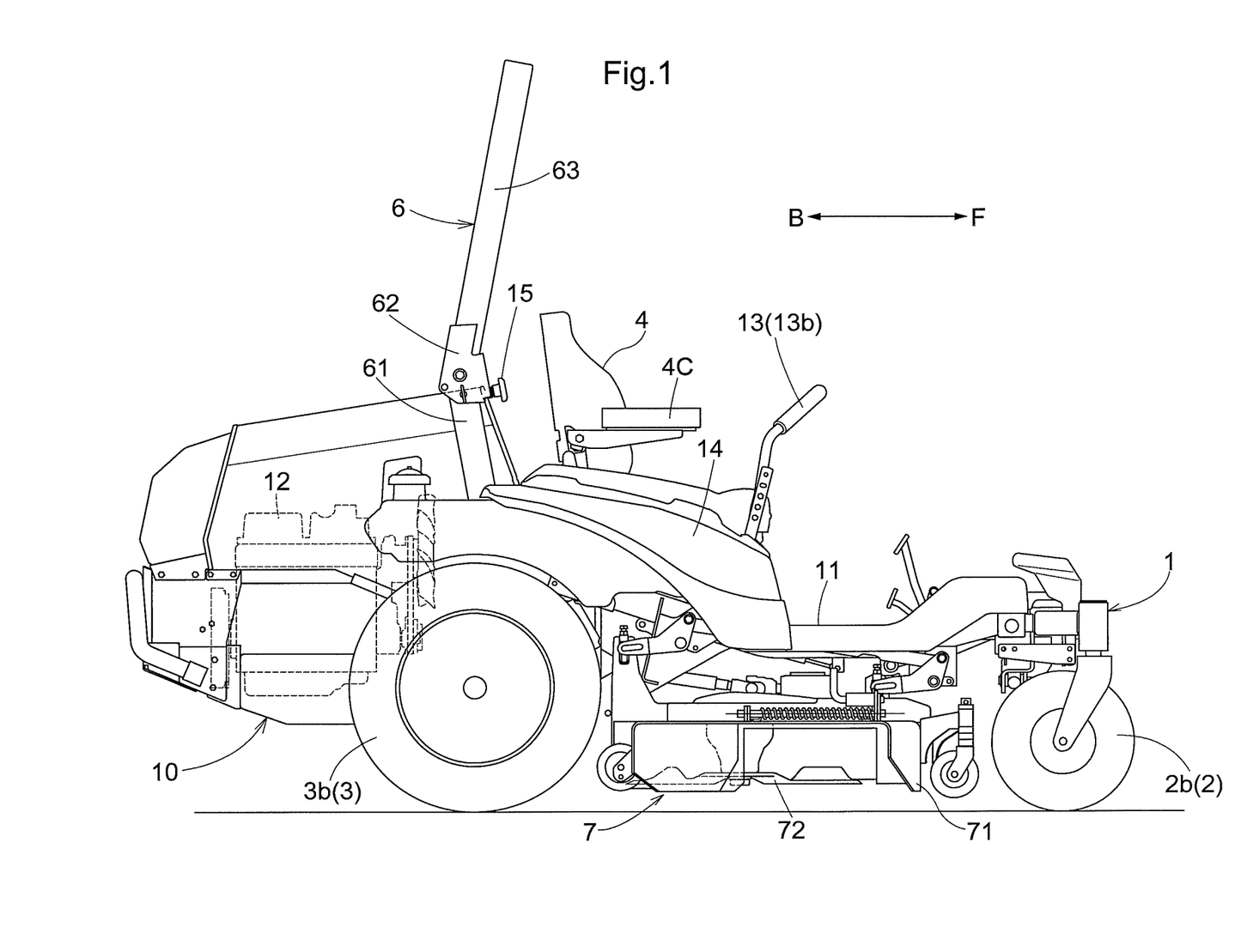
FIG. 1 is a left side view of a grass mower.
Figure 2:
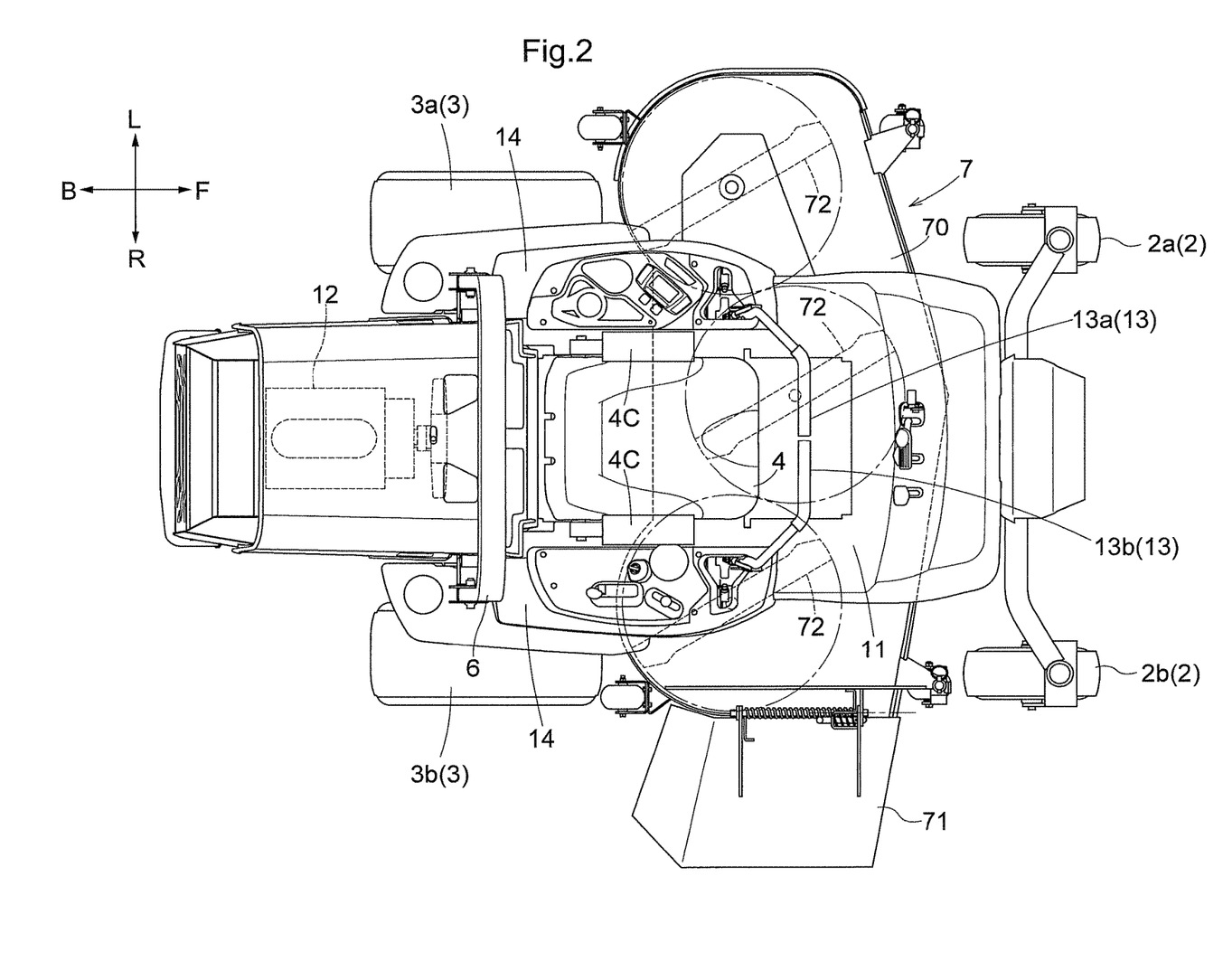
FIG. 2 is a plan view of the grass mower.

As shown in FIG. 1 and FIG. 2, this grass mower includes a vehicle body frame 10 supported on the ground by a front wheel unit 2 configured as a caster unit and a rear wheel unit 3. This grass mower is configured as a so-called zero-turn mower configured such that a left rear wheel 3a and a right rear wheel 3b together constituting the rear wheel unit 3 can be controlled independently of each other in their forward/reverse speeds. The front wheel unit 2 includes a pair of left and right front wheels 2a, 2b. The vehicle body frame 10 includes a pair of left and right longitudinal frames extending in the vehicle body front/rear direction and a cross beam extending in the vehicle body transverse direction to interconnect the longitudinal frames and is manufactured with using angular pipes and plate members. Between the front wheel unit 2 and the rear wheel unit 3, a mower unit 7 is suspended from the vehicle body frame 10 to be liftable up/down.

At a center portion of the vehicle body frame 10, a driver's seat 4 is provided. Due to the absence of any canopy, the driver's seat 4 is exposed to the outside. On a top face of a front portion of the vehicle body frame 10, a floor plate 11 is laid to be used as a footrest for the driver. At a sloped front area of the floor plate 11, a foot operation tool is disposed. At a rear portion of the vehicle body frame 10 which portion is on the rear side of the seat 4, there are provided an engine 12 which is an internal combustion engine and engine auxiliary devices such as a radiator.

A maneuvering unit 13 which is one of user operation devices includes a left maneuvering lever 13a disposed on the left side of the seat 4 and a right maneuvering lever 13b disposed on the right side of the seat 4. The left maneuvering lever 13a is used for adjusting a rotational speed of the left rear wheel 3a. The right maneuvering lever 13b is used for adjusting a rotational speed of the right rear wheel 3b. The left maneuvering lever 13a and the right maneuvering lever 13b are pivotally displaceable to/across a forward speed changing range, neutral position and a reverse speed changing range.

[0014]

On the left and right sides of the seat 4, fenders 14 are provided. On top faces of the fenders 14, there are arranged user operation devices such as various operation levers and operation buttons, etc. Rearwardly of the seat 4, an arch-shaped Rollover Protective Structure ("ROPS") 6 is disposed vertically. The ROPS 6 includes a pair of left and right lower members 61, a pair of left and right pivotal decks 62, and an arch-shaped upper member 63. Lower ends of the lower members 61 are fixed to the vehicle body frame 10. Respective leg portions of the upper member 63 are attached to the pivotal decks 62 to be pivotable about a horizontal axis. The pivotal decks 62 include a stopper mechanism for holding the upper member 63 at a particular angle between about 110 degrees and 0 degree (horizontal). At a front wall of the pivotal deck 62, there is provided a cushion stopper 15 for receiving the seat 4.

The mower unit 7 includes a side discharge type mower deck 70 and a discharge cover 71 provided on a cut grass discharging side of the mower deck 70. In the inner space of the mower deck 70, there are provided three blades 72 disposed side by side along the vehicle body transverse direction. The blades 72 are rotated by PTO power from the engine 12.

Power from the engine 12 is transmitted independently to the right rear wheel 3a and the left rear wheel 3b via a traveling transmission including an unillustrated pair of left and right HST's (hydrostatic transmissions). Speed ratios including forward traveling, reverse traveling and neutral are adjusted based on pivotal operations on the left maneuvering lever 13a and the right maneuvering lever 13b. More particularly, in response to user operations on the left maneuvering lever 13a and the right maneuvering lever 13b, there are realized a stopped state, a straight traveling state, a slow turning state, a pivot turning state and a spin turning state, respectively. The stopped state is realized by stopping the left rear wheel 3a and the right rear wheel 3b. The straight traveling state is realized by rotatably driving the left rear wheel 3a and the right rear wheel 3b at an equal speed forwardly or reversely. The slow turning state is realized by rotatably driving the left rear wheel 3a and the right rear wheel 3b at different speeds forwardly or reversely. The pivot turning state is realized by stopping one of the left rear wheel 3a and the right rear wheel 3b and rotatably driving the other forwardly or reversely. The spin turning state is realized by rotatably driving one of the left rear wheel 3a and the right rear wheel 3b forwardly and rotatably driving the other reversely.

Figure 3:
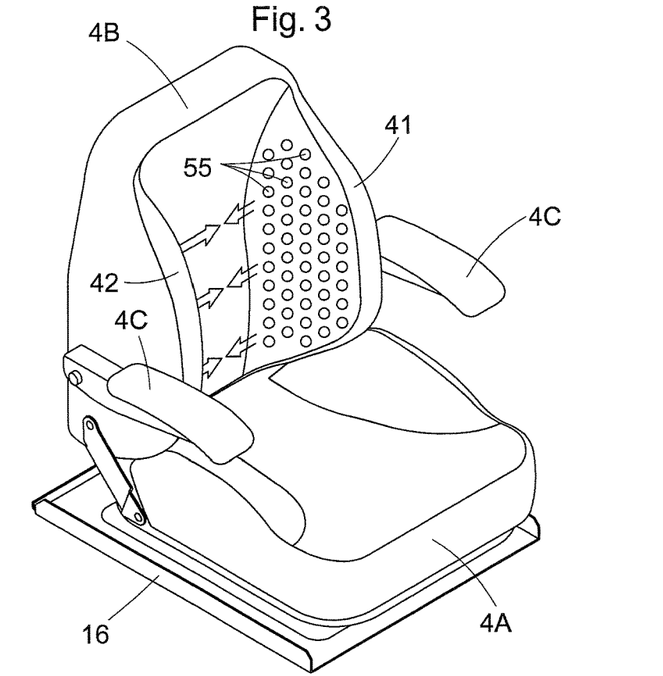
FIG. 3 is a perspective view of a driver's seat as viewed from left front upper side.
Figure 4:
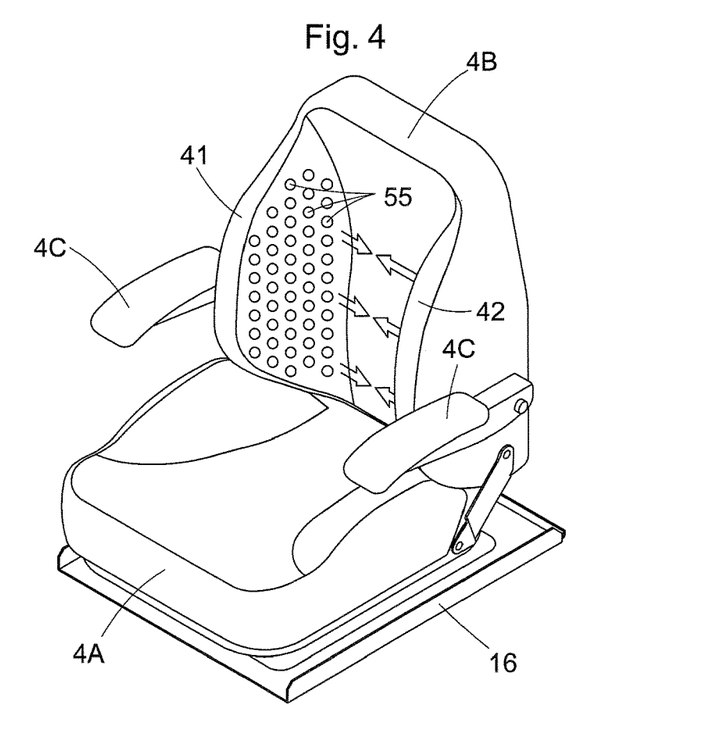
FIG. 4 is a perspective view of the driver's seat as viewed from right front upper side.
Figure 5:
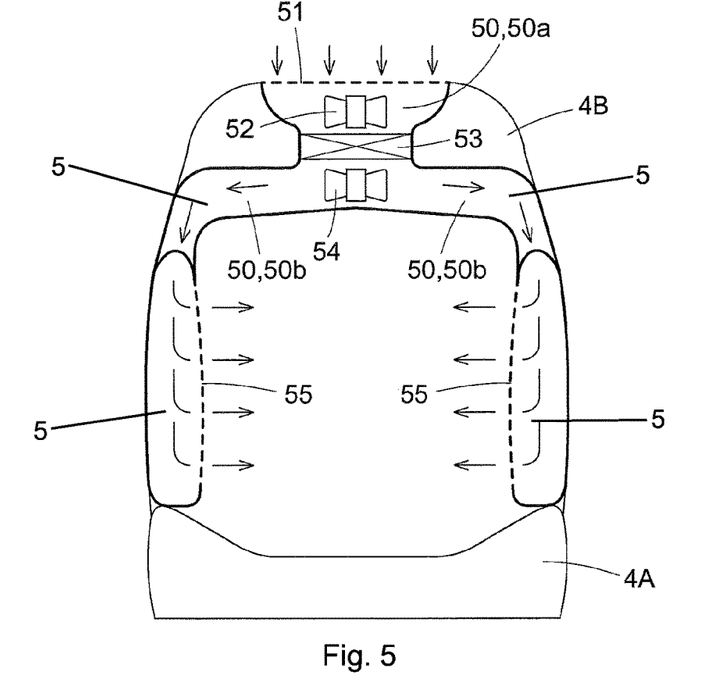
FIG. 5 is a front view of the driver's seat.
Figure 6:
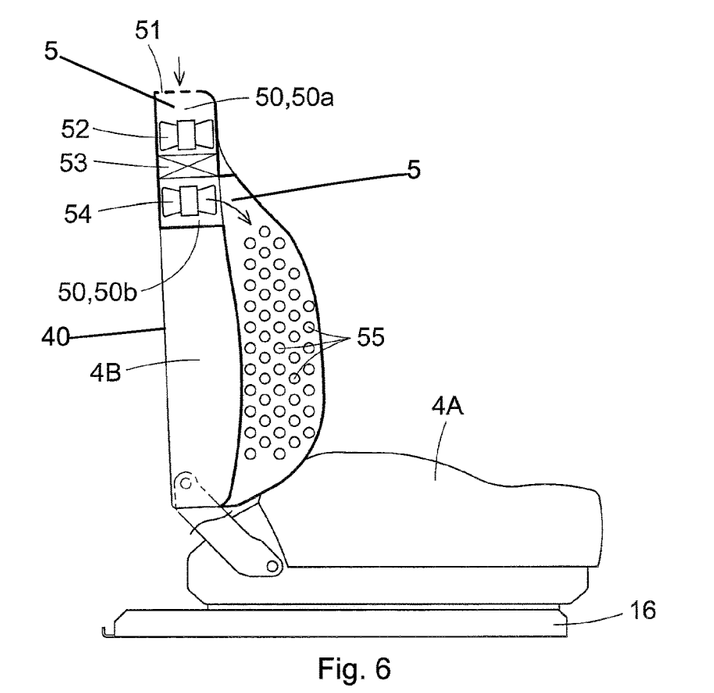
FIG. 6 is a side view in section of the driver's seat.

Next, with reference to FIGS. 3 through 6, the seat 4 and an air handling system 5 incorporated in the seat 4 will be explained. FIG. 3 is a perspective view of the seat 4 as viewed from left front upper side, and FIG. 4 is a perspective view of the seat 4 as viewed from right front upper side. FIG. 5 is a front view schematically showing the air handling system 5 provided in the seat 4. FIG. 6 is a side view schematically showing the air handling system 5 provided in the seat 4. As may be apparent from FIG. 3 and FIG. 4, the seat 4 consists essentially of a seat cushion 4A, a seatback 4B and armrests 4C. The seat cushion 4A is attached to a seat deck 16 via an unillustrated front/rear slide mechanism. The seat deck 16 is supported to the vehicle body frame 10. The seatback 4B is mounted to be posture-changeable between a raised posture for allowing easy getting on/off of the driver and a horizontal posture providing armrest function. The armrests 4C are pivotally attached to opposed lateral faces of the seatback 4B which are not shown in FIG. 5 and FIG. 6. The seatback 4B incorporates the air handling system 5 for discharging warm air or cool air to a seated driver.

The seatback 4B includes a rectangular-shaped back body 40 having a small thickness, a right side cover 41 bent forwardly from the right side of the back body 40 and a left side cover 42 bent forwardly from the left side of the back body 40.

As may be apparent from FIG. 5 and FIG. 6, the air handling system 5 employed in this embodiment consists of an air circulation space 50 formed inside the seatback 4B, an inlet portion 51, a first fan 52, an air conditioner unit 53, a second fan 54 and outlet portions 55. The air circulation space 50 extends from an upper inner portion of the back body 40 to the right side cover 41 and the left side cover 42.

The inlet portion 51 is formed of a porous body and provided on the top face of the back body 40. The air circulation space 50 allows air communication with the upper area of the back body 40 via the inlet portion 51. The outlet portions 55 too are formed of a porous body and provided on mutually opposed inner faces of the right side cover 41 and the left side cover 42. The air circulation space 50 allows air communication with an area (body area where the seated driver's body is accommodated) surrounded by the back body 40, the right side cover 41 and the left side cover 42, via the outlet portions 55.

The first fan 52, the air conditioner unit 53 and the second fan 54 are disposed in the air circulation space 50. The first fan 52 introduces air present upwardly of the back body 40 into the air circulation space 50 via the inlet portion 51. The air conditioner unit 53 is an "air handling device" and includes a cooler unit and a heater unit which are switchable to effect an air heating treatment or an air cooling treatment on air introduced by the first fan 52. The second fan 54 introduces handled (conditioned) air handled (conditioned) by the air conditioner unit 53 and discharges this handled air to the above-described body area via the outlet portions 55.

Namely, in the instant embodiment, the air circulation space 50 is divided into a first area 50a which extends from the inlet portion 51 through the first fan 52 to the air conditioner unit 53 and a second area 50b which extends from the air conditioner unit 53 via the second fan 54 to the outlet portions 55. Air introduced via the outlet portions 55 and less affected by the hot air from the engine 12 will be handled by the air conditioner unit 53. The conditioned air is discharged via the outlet portions 55 and blown against the body of the seated driver. As the outlet portions 55 are formed in the right side cover 41 and the left side cover 42, the possibility of the outlet portions 55 blocked by the seated driver is low.

Figure 7:
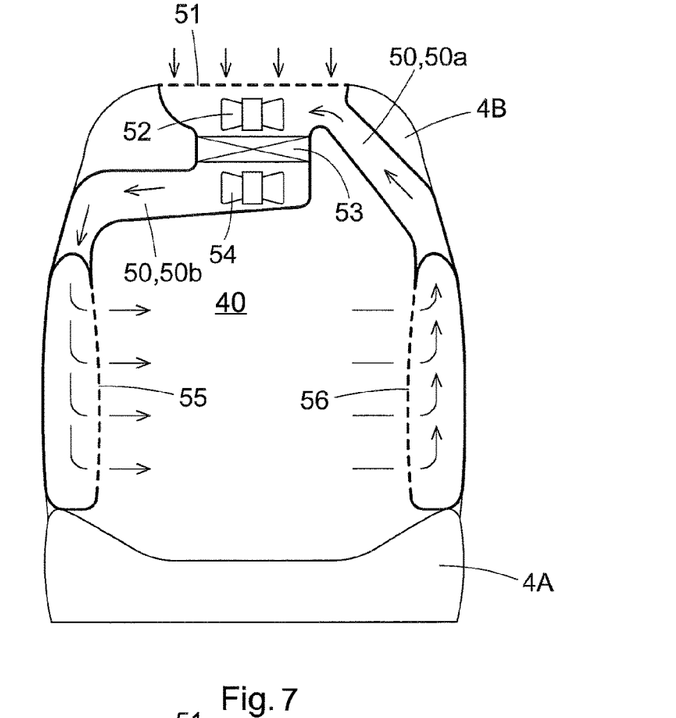
FIG. 7 is a front view of a driver's seat according to a further embodiment.
Figure 8:
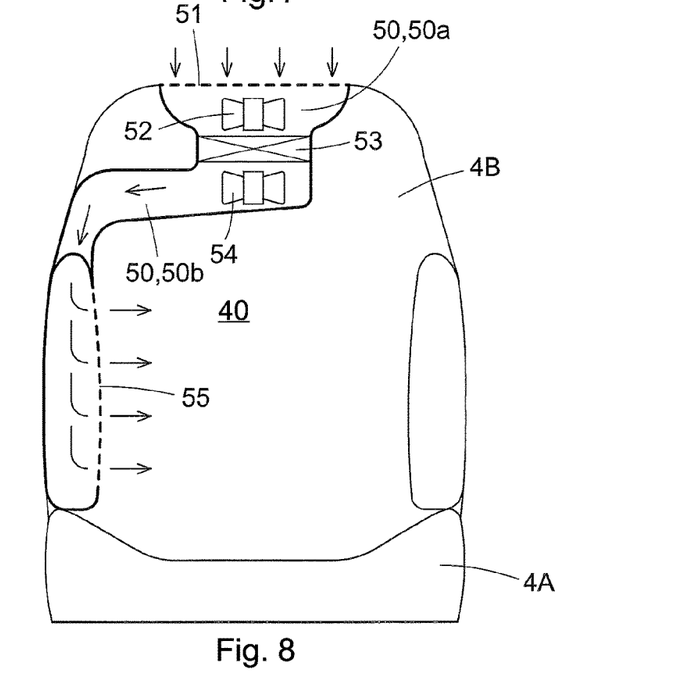
FIG. 8 is a front view of a driver's seat according to a still further embodiment.

FIG. 7 and FIG. 8 show further embodiments of the air handling system incorporated in the seatback 4A. In the air handling system shown in FIG. 7, in the inner face of the left side cover 41, a side inlet portion 56 is provided instead of the outlet portion 55. The first area 50a of the air circulation space 50 extends from the back body 40 to the left side cover 42 and air introduced by the first fan 52 via the inlet portion 51 and the side inlet portion 56 will be sent into the air conditioner unit 53. Namely, in this embodiment, conditioned air discharged via the outlet portion 55 provided in the inner face of the right side cover 41 will flow along and past the body of the seated driver and be introduced via the outlet portion 55 provided in the inner face of the left side cover 42 and the side inlet portion 56. Incidentally, though not shown, the side inlet portion 56 may be provided in the right side cover 41 and the outlet portion 55 may be provided in the left side cover 42.

In the air handling system shown in FIG. 8, the left side cover 42 is provided with neither the outlet portion 55 nor the side inlet portion 56, and the outlet portion 55 is provided only in the right side cover 41. Conversely, the right side cover 41 may be provided with neither of them and the outlet portion 55 may be provided in the left side cover 42.

In the foregoing embodiment, as the fan, the first fan 52 and the second fan 54 are provided on the entrance side and the exit side of the air conditioner unit 53. Instead, additional fans may be provided adjacent the inlet portion 51, the outlet portion 55 and the side inlet portion 56.

Figure 9:
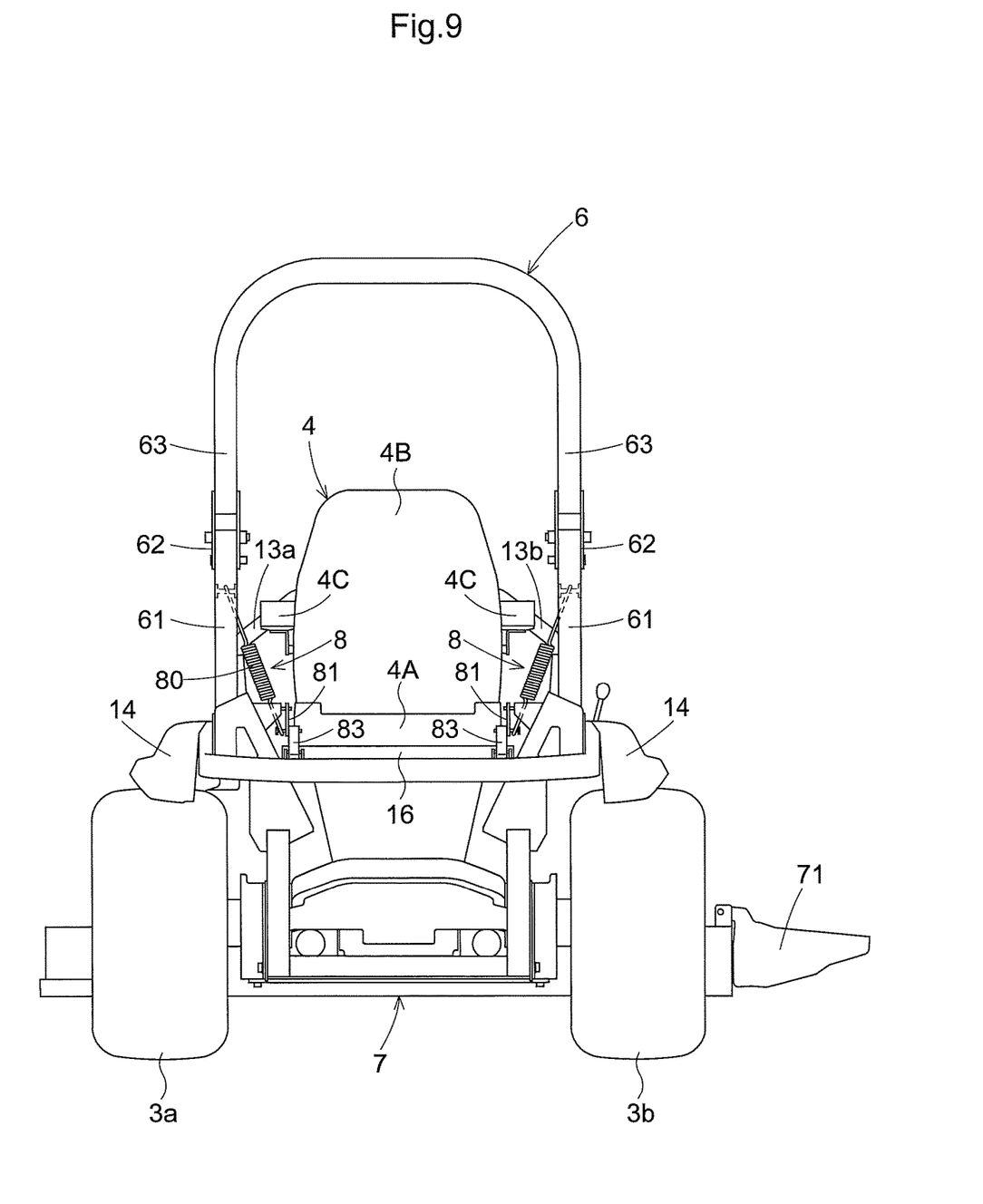
FIG. 9 is a rear view of a grass mower with its driver's seat being attached via a suspension device.
Figure 10:
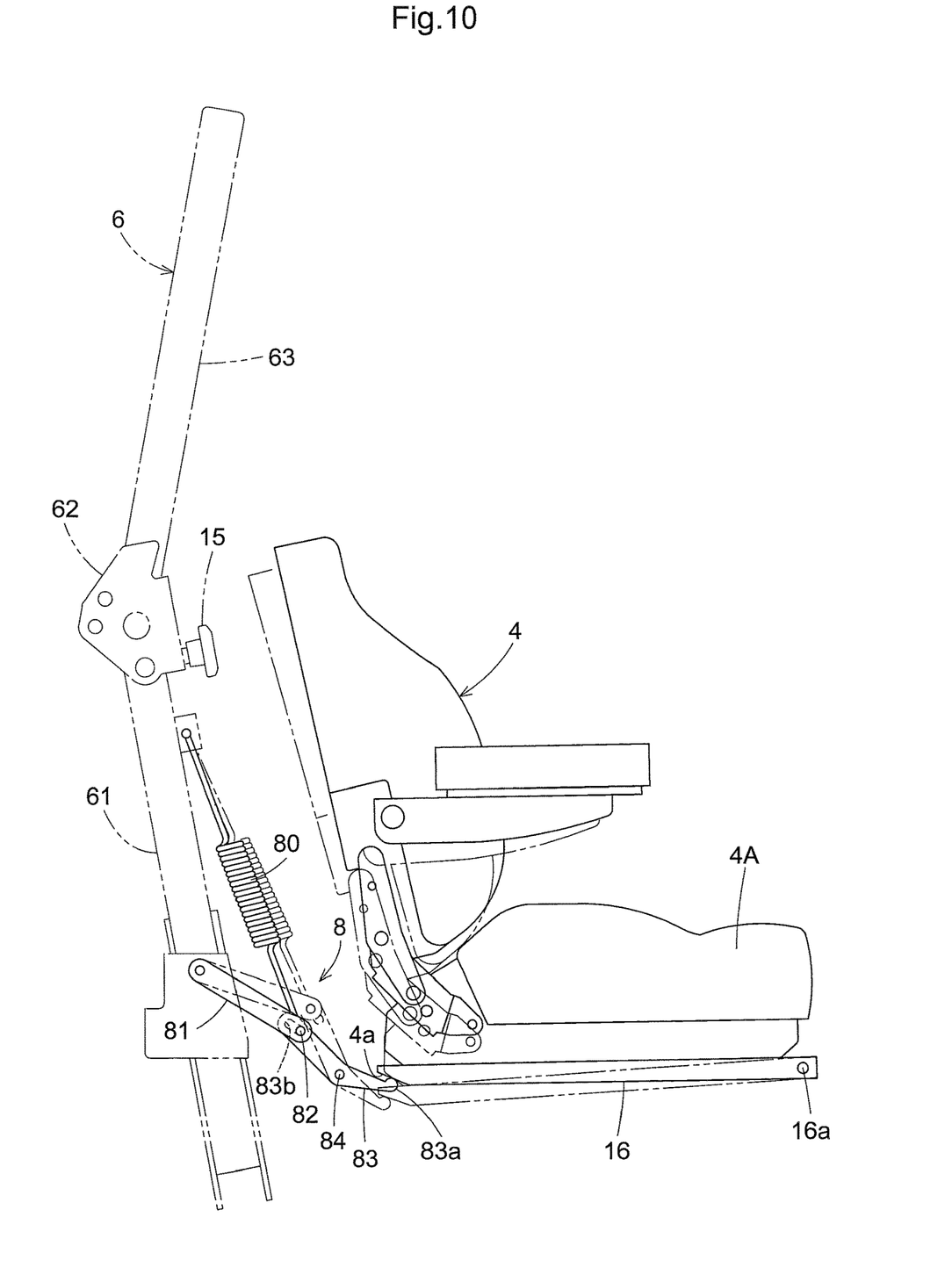
FIG. 10 is a side view showing the suspension device for the driver's seat.

For improvement of comfort of the seat 4, this seat 4 is supported to the vehicle body frame 10 via the suspension device. FIG. 9 and FIG. 10 show such suspension device 8 for the seat 4. This suspension device 8 is a strut type. The seat deck 16 of the seat 4 is configured to be pivotable about a pivot shaft 16a having a horizontal pivot and provided adjacent its front end.

The suspension device 8, as shown in FIG. 10, includes a telescopic shock absorber 80, a lower arm 81, a cross pin 82, and a crank arm 83. In FIG. 9 and FIG. 10, the shock absorber 80 is shown as a simple spring. However, various types of shock absorber may be employed. One end (upper end) of this shock absorber 80 is vertically pivotally supported to upper portions of the lower members 61 of the ROPS 6. One end of the lower arm 81 is vertically pivotally supported to the upper portion of the lower member 61. At the other end of the lower arm 81, there is provided the cross pin 82 which extends in the vehicle body transverse direction. The crank arm 83 is supported to be pivotable about a pivot shaft 84 supported at its intermediate portion to the vehicle body frame 10. At a front end of one of the crank arms 83, a tongue piece 83a is formed and this tongue piece 83a is placed in contact with an inclined face 4a formed at the rear end of the seat deck 16. The other one of the crank arms 83 defines an accommodation opening 83b, in which the cross pin 82 is inserted. Further, the other end (lower end) of the telescopic shock absorber 80 is pivotally connected to the cross pin 82.

With the suspension device 8 configured as described above, the seat 4 is pivotable about the pivot shaft 16a. Namely, the seat 4 can move up/down by the cushioning effect of the shock absorber 80, thus cushioning vibration during traveling due to influence from the road surface.

In the foregoing embodiment the grass mower is configured as an open-seater type having no canopy. However, the invention is applicable also to a grass mower having a canopy.

Incidentally, the arrangements disclosed in the foregoing embodiment (including the further embodiments) can be used in combination with any combination disclosed in the other embodiments unless contradiction results from such combining. Further, the embodiments disclosed in this detailed description are illustrative and the present invention is not limited thereto, but various modifications thereof can be made when appropriate within a range not departing from the object of the invention.

The invention claimed is:

1. A work vehicle comprising:
a vehicle body frame;
a seat mounted on the vehicle body frame and including a seatback and a seat cushion; and
an air handling system incorporated within the seatback;
wherein the air handling system includes:
an air circulation space formed inside the seatback,
an air handling device disposed inside the air circulation space and being located closer to a top of the seatback than to a bottom of the seatback,
a fan located at least one of:
above the air handling device; or
below the air handling device;
an inlet portion formed in a top face of the seatback for letting in ambient air into the air circulation space, and
an outlet portion located below the air handling device and arranged in a lateral portion of the seatback for discharging handled air handled by the air handling device to an area forward of the seatback in a vehicle body transverse direction, and
wherein an air flow of the air handling system includes:
a downward air flow from the inlet portion to the air handling device; and
a downward or horizontal air flow from the air handling device to the outlet portion.

2. The work vehicle of claim 1, wherein:
the seatback includes a left side cover covering the left side of a person seated at the seat and a right side cover covering the right side of the person; and
the outlet portion is formed in one or both of the left side cover and the right side cover.

3. The work vehicle of claim 2, wherein:
the outlet portion is formed in one of the left side cover and the right side cover and an auxiliary inlet portion for introducing ambient air into the air circulation space is formed in the other of the left side cover and the right side cover.

4. The work vehicle of claim 2, wherein an engine is disposed rearwardly of the seatback and the left side cover and the right side cover act as protective walls against heated air from the engine.

5. The work vehicle of claim 1, wherein the air handling device includes at least one of a blower unit, a heater unit and a cooler unit.

6. The work vehicle of claim 1, wherein the air flow enters the inlet portion and exits the outlet portion without moving in a vertically upward direction.

7. An open-seater work vehicle configured to prevent engine heated air from entering into a seat, the work vehicle comprising:
a vehicle body frame;
a seat mounted on the vehicle body frame and including a seatback and a seat cushion; and
an air handling system incorporated within the seatback;
the air handling system comprising:
an air circulation space formed inside an upper portion of the seatback,
an air conditioning device disposed inside the air circulation space and being located closer to a top of the seat than to a bottom of the seat,
a fan located at least one of:
above the air conditioning device; or
below the air conditioning device;
an inlet portion formed in a top face of the seatback for letting in ambient air into the air circulation space, and
an outlet portion located below the air conditioning device and arranged in a lateral portion of the seatback for discharging air conditioned by the air conditioning device to an area forward of the seatback in a vehicle body transverse direction, and
wherein an air flow of the air handling system includes:
a vertically downward air flow from a position outside the seat through the inlet portion and allowing the ambient air to enter the seat pass through the air circulation space; and
an air flow through the air conditioning device; and
a horizontal and downward air flow from the air conditioning device to the outlet portion.

8. A grass mowing vehicle configured to prevent engine heated air from entering into a seat, the vehicle comprising:
a vehicle body frame;
a seat mounted on the vehicle body frame and including a seatback and a seat cushion; and
an air handling system incorporated within the seatback;
the air handling system comprising:
an air circulation space formed inside an upper portion of the seatback,
an air conditioning device disposed inside the air circulation space and being located closer to a top of the seat than to a bottom of the seat,
a fan located at least one of:
above the air conditioning device; or
below the air conditioning device;
an inlet portion formed in a top face of the seatback for letting in ambient air into the air circulation space, and
an outlet portion located below the air conditioning device and arranged in a lateral portion of the seatback for discharging air conditioned by the air conditioning device to an area forward of the seatback in a vehicle body transverse direction, and
wherein an air flow of the air handling system includes:
a vertically downward air flow from a position outside the seat through the inlet portion and allowing the ambient air to enter the seat pass through the air circulation space; and
an air flow through the air conditioning device; and
a horizontal and downward air flow from the air conditioning device to the outlet portion.

* * * * *